(12) United States Patent
Lee et al.

(10) Patent No.: US 10,356,300 B2
(45) Date of Patent: Jul. 16, 2019

(54) SEAMLESS ZOOMING ON DUAL CAMERA

(71) Applicant: MEDIATEK INC., Hsin-Chu (TW)

(72) Inventors: Ping-Han Lee, Taipei (TW); Yu-Pao Tsai, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/722,665

(22) Filed: Oct. 2, 2017

(65) Prior Publication Data

US 2018/0183982 A1   Jun. 28, 2018

Related U.S. Application Data

(60) Provisional application No. 62/438,479, filed on Dec. 23, 2016.

(51) Int. Cl.
*H04N 5/232* (2006.01)
*H04N 5/225* (2006.01)
*H04N 5/247* (2006.01)
*G02B 13/00* (2006.01)

(52) U.S. Cl.
CPC ......... *H04N 5/2258* (2013.01); *G02B 13/001* (2013.01); *H04N 5/23238* (2013.01); *H04N 5/23296* (2013.01); *H04N 5/247* (2013.01)

(58) Field of Classification Search
CPC .................................................. H04N 5/23296
USPC .......................................... 348/240.99–240.3
See application file for complete search history.

(56) References Cited

U.S. PATENT DOCUMENTS

| 4,097,882 A | 6/1978 | Engelsmann |
| 4,199,785 A | 4/1980 | McCullough et al. |
| 6,804,460 B1 | 10/2004 | Oshima et al. |
| 7,206,136 B2 | 4/2007 | Labaziewicz et al. |
| 7,305,180 B2 | 12/2007 | Labaziewicz et al. |
| 7,450,837 B2 | 11/2008 | Matsusaka |
| 8,000,024 B2 | 8/2011 | Ori |
| 8,553,106 B2 | 10/2013 | Scarff |
| 9,185,291 B1 * | 11/2015 | Shabtay ............... H04N 5/2258 |
| 9,325,899 B1 * | 4/2016 | Chou ..................... G06T 7/593 |
| 9,413,972 B2 | 8/2016 | Shabtay et al. |

(Continued)

FOREIGN PATENT DOCUMENTS

| CN | 101750720 A | 6/2010 |
| TW | 201813474 A | 4/2018 |

*Primary Examiner* — Anthony J Daniels (74) *Attorney, Agent, or Firm* — McClure, Qualey & Rodack, LLP (57) ABSTRACT

A dual-camera device is provided. The dual-camera device includes wide and telephoto imaging sections with respective lens/sensor combinations, and a processor. The wide and telephoto imaging sections provide wide image data and telephoto image data, respectively. At least one misalignment error exists between the wide and telephoto imaging sections. The processor generates an output image provided with a smooth transition when switching between a lower zooming factor and a higher zooming factor. The processor warps the wide image data using a portion of the misalignment error to generate base wide image data, and warps the telephoto image data using the remaining portion of the misalignment error to generate base telephoto image data. The processor generates the output image using the base wide image data at the lower zooming factor, and generates the output image using the base telephoto image data at the higher zooming factor.

13 Claims, 9 Drawing Sheets

(56) References Cited

U.S. PATENT DOCUMENTS

| | | | |
|---|---|---|---|
| 9,420,190 B2 | 8/2016 | Griffith et al. | |
| 9,485,432 B1 | 11/2016 | Medasani et al. | |
| 2018/0033155 A1* | 2/2018 | Jia | G06T 7/13 |
| 2018/0048825 A1* | 2/2018 | Wang | H04N 5/2258 |
| 2018/0098000 A1* | 4/2018 | Park | G02B 13/0015 |
| 2018/0160046 A1* | 6/2018 | Nash | H04N 5/23296 |

* cited by examiner

SEAMLESS ZOOMING ON DUAL CAMERA

CROSS REFERENCE TO RELATED APPLICATIONS

This application claims the benefit of U.S. Provisional Application No. 62/438,479 filed on Dec. 23, 2016, the entirety of which is incorporated by reference herein.

BACKGROUND OF THE INVENTION

Field of the Invention

The present invention relates to a camera, and, in particular, to a dual camera and an associated seamless zooming method.

Description of the Related Art

Optical zoom is currently one of the most important smartphone camera features that appeals to users. Unfortunately, the physical characteristics of a lens makes it difficult to design a single camera smartphone setup that includes an optical zoom without sacrificing the phone's overall appearance or adding to its thickness.

A wide-angle plus telephoto dual camera module that has been developed in recent years provides the industry with a solution. Since image zooming can be switched between the wide-angle imaging section and the telephoto imaging section in the dual-camera module, the user may have a better experience with a smooth optical zoom function using a smartphone equipped with a wide-angle plus telephoto dual-camera module. The wide-angle lens and telephoto lens are usually referred to as the "wide" lens and the "tele" lens, and the focal length of a wide-angle lens in the wide-angle imaging section is smaller than that of a telephoto lens in the telephoto imaging section. For example, the wide-angle lens may have a shorter focal length, and the telephoto lens may have a longer focal length. Additionally, the wide-angle lens and the telephoto lens may have different FOVs.

However, in the camera module assembly process, parameters of camera modules vary due to manufacturing tolerance, and thus the wide-angle lens and the telephoto lens in the dual camera module may have camera misalignment errors. The six degrees of freedom are based on aligning the object relative to three perpendicular axes: x, y, and z. The camera lens can be moved forward or backward (y), up or down (z), and left or right (x), combined with rotation around the three perpendicular axes—usually termed pitch, yaw, and roll (rotation indicated by $\theta$). Together, these movements constitute the six degrees of freedom x, y, z, $\theta x$, $\theta y$, and $\theta z$. As a result, the user may sense unsmooth zoom preview images caused by camera misalignment errors during image zooming.

Accordingly, there is a need for a dual-camera device and an associated seamless digital zooming method to solve the aforementioned problem.

BRIEF SUMMARY OF THE INVENTION

A detailed description is given in the following embodiments with reference to the accompanying drawings.

In an exemplary embodiment, a dual-camera device is provided. The dual-camera device includes: a wide imaging section, a telephoto imaging section, and a processor. The wide imaging section includes a wide lens with a wide field of view (FOV), and a wide image sensor, wherein the wide imaging section provides wide image data of an object or scene. The telephoto imaging section includes a telephoto lens with a telephoto FOV that is narrower than the wide FOV, and a telephoto image sensor, wherein the telephoto imaging section provides telephoto image data of the object or scene, and at least one misalignment error exists between the wide imaging section and the telephoto imaging section. The processor is coupled to the wide imaging section and the telephoto imaging section, and is configured to generate an output image provided with a smooth transition when switching between a lower zooming factor and a higher zooming factor. The processor warps the wide image data using a portion of the misalignment error to generate base wide image data, and warps the telephoto image data using the remaining portion of the misalignment error to generate base telephoto image data. The processor generates the output image using the base wide image data at the lower zooming factor, and generates the output image using the base telephoto image data at the higher zooming factor.

In another exemplary embodiment, a dual-camera device is provided. The dual-camera device includes: a wide imaging section, a telephoto imaging section, and a processor. The wide imaging section includes a wide lens with a wide field of view (FOV), and a wide image sensor, wherein the wide imaging section provides wide image data of an object or scene. The telephoto imaging section includes a telephoto lens with a telephoto FOV that is narrower than the wide FOV, and a telephoto image sensor, wherein the telephoto imaging section provides telephoto image data of the object or scene, and at least one misalignment error exists between the wide imaging section and the telephoto imaging section. The processor is coupled to the wide imaging section and the telephoto imaging section, and is configured to generate an output image provided with a smooth transition when switching between a lower zooming factor and a higher zooming factor. The processor generates the output image using the wide image data at the lower zooming factor. The processor warps the telephoto image data using a portion of the misalignment errors, and the portion of the misalignment errors is associated with the higher zooming factor. The processor generates the output image using the warped telephoto image data at the higher zooming factor.

In yet another exemplary embodiment, a dual-camera device is provided. The dual-camera device includes: a wide imaging section, a telephoto imaging section, and a processor. The wide imaging section includes a wide lens with a wide field of view (FOV), and a wide image sensor, wherein the wide imaging section provides wide image data of an object or scene. The telephoto imaging section includes a telephoto lens with a telephoto FOV that is narrower than the wide FOV, and a telephoto image sensor, wherein the telephoto imaging section provides telephoto image data of the object or scene, and at least one misalignment error exists between the wide imaging section and the telephoto imaging section. The processor is coupled to the wide imaging section and the telephoto imaging section, and is configured to generate an output image provided with a smooth transition when switching between a lower zooming factor and a higher zooming factor. The processor warps the wide image data using a portion of the misalignment error to generate base wide image data, and the portion of the misalignment errors is associated with the lower zooming factor. The processor warps the telephoto image data using the remaining portion of the misalignment error to generate base telephoto image data, and the remaining portion of the misalignment errors is associated with the higher zooming factor. The processor generates the output image using the base wide image data at the lower zooming factor, and generates the output image using the base telephoto image data at the higher zooming factor.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. Terms such as "wide lens", "wide image", and "wide image data" are used herein. These terms are used in the context of a dual-camera device that includes a wide-angle lens and a telephoto lens. It will be understood that terms such as "wide lens", "wide image", and "wide image data"refer to "wide-angle lens", "wide-angle image", and "wide-angle image data"with respect to a telephoto lens and telephoto image, respectively, as understood by persons skilled in the art.

Figure 1:
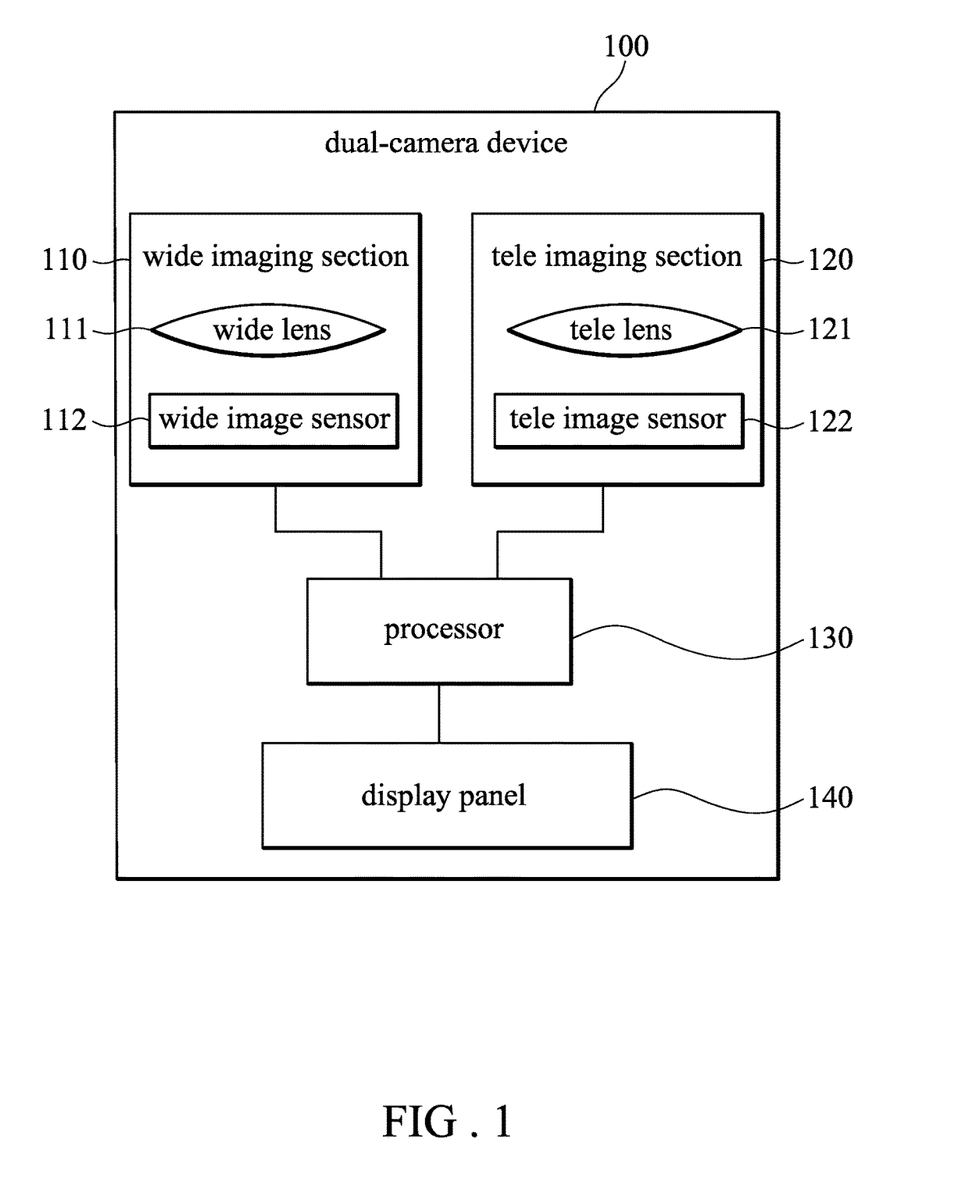
FIG. 1 is a block diagram of a dual-camera device in accordance with an embodiment of the invention.

FIG. 1 is a block diagram of a dual-camera device in accordance with an embodiment of the invention. As shown in FIG. 1, the dual-camera device 100 includes a wide imaging section 110, a telephoto imaging section 120, and a processor 130. The wide imaging section 110 includes a wide lens 111 and a wide image sensor 112, and the telephoto imaging section 120 includes a telephoto lens 121 and a telephoto (tele) image sensor 122. The wide image sensor 112 and the telephoto image sensor 122 may be physically separate or may be parts of a single larger image sensor, and the resolution of the wide image sensor 112 can be equal to or different from that of the telephoto image sensor 122.

The processor 130 is coupled to the wide imaging section 110 and the telephoto imaging section 120, and is configured to receive the wide image captured by the wide imaging section 110 and the telephoto image captured by the telephoto imaging section 120, and perform corresponding image processing on the wide image and the telephoto image for calibrating the misalignment errors between the wide lens 111 and the telephoto lens 121 during image zooming. Specifically, the processor 130 may generate a preview image that is fused from information obtained by the wide imaging section 110 and the telephoto imaging section 120 at all zooming levels.

In an embodiment, the dual-camera device 100 may further include a display panel 140 for displaying the preview image. For example, the display panel 140 may be a touch panel, and the processor 130 may render a user interface for the zooming function on the display panel. Thus, the user may press on the display panel 140 to adjust the zooming factor for the preview image.

Specifically, the zooming factor may be a positive number equal to or greater than 1. When the zooming factor is 1, the processor 130 may use the wide image captured by the wide imaging section 110 as the reference image for generating the preview image. For example, the reference image is scaled (i.e. resized) to fit the resolution of the display panel 140, and image cropping can be applied to the scaled reference image to generate the preview image (e.g. the center region can be cropped) if necessary. When the zooming factor is set to a value between 1 and a predetermined multiple, the processor 130 may scale the reference image (i.e. the wide image) in proportion to the zooming factor and perform image cropping on the scaled reference image to generator the preview image. In general, the zooming factor is determined by the ratio between the wide camera FOV and the tele camera FOV. For purposes of description, the predetermined multiple is 2, and it may vary depending on the specification and optical features of the wide lens and the telephoto lens. For purposes of description, the predetermined multiple is 2 in the following embodiments.

When the zooming factor is set to 2, the processor may use the telephoto image captured by the telephoto imaging section 120 as the reference image for generating the preview image. For example, the reference image is scaled to fit the resolution of the display panel 140, and image cropping can be applied to the scaled reference image to generate the preview image (e.g. the center region can be cropped) if necessary. When the zooming factor is set to a higher value than 2, the processor 130 may scale the reference image (i.e. the telephoto image) in proportion to the zooming factor and perform image cropping on the scaled reference image to generator the preview image.

Figure 2:
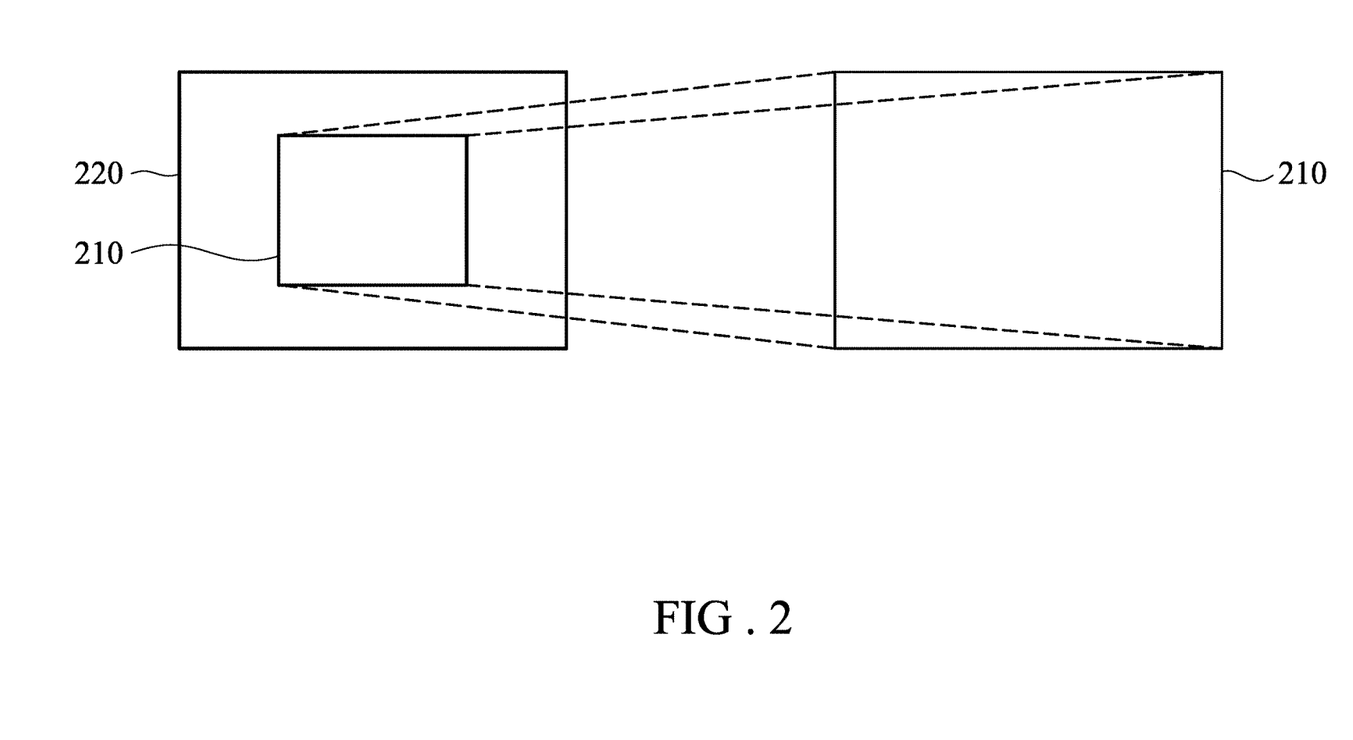
FIG. 2 is an example of a wide image sensor, a telephoto image sensor, and their respective FOVs without misalignment errors.

FIG. 2 is an example of a wide image sensor, a telephoto image sensor, and their respective FOVs without misalignment errors. As illustrated in FIG. 2, the FOV 210 of the telephoto image sensor 122 is half the FOV 220 of the wide image sensor 112. It should be noted that, for purposes of description, the resolutions of the telephoto image sensor 122 and the wide image sensor 112 are the same. Specifically, the wide lens 111 has a shorter focal length and a wider FOV, and thus a wide-angle image is obtained by the wide image sensor 112. The telephoto lens 121 has a longer focal length and a narrower FOV, and thus a telephoto image is obtained by the telephoto image sensor 122. It should be noted that the wide-angle image and the telephoto image have the same resolution.

Since there is no misalignment error between the wide lens 111 and the telephoto lens 121, the processor 130 may directly switch the reference image from the wide image to the telephoto image when the zooming factor is increased from 1 to 2. Conversely, the processor 130 may also directly switch the reference image from the telephoto image to the wide image when the zooming factor is decreased from a large value to 2.

Figure 3:
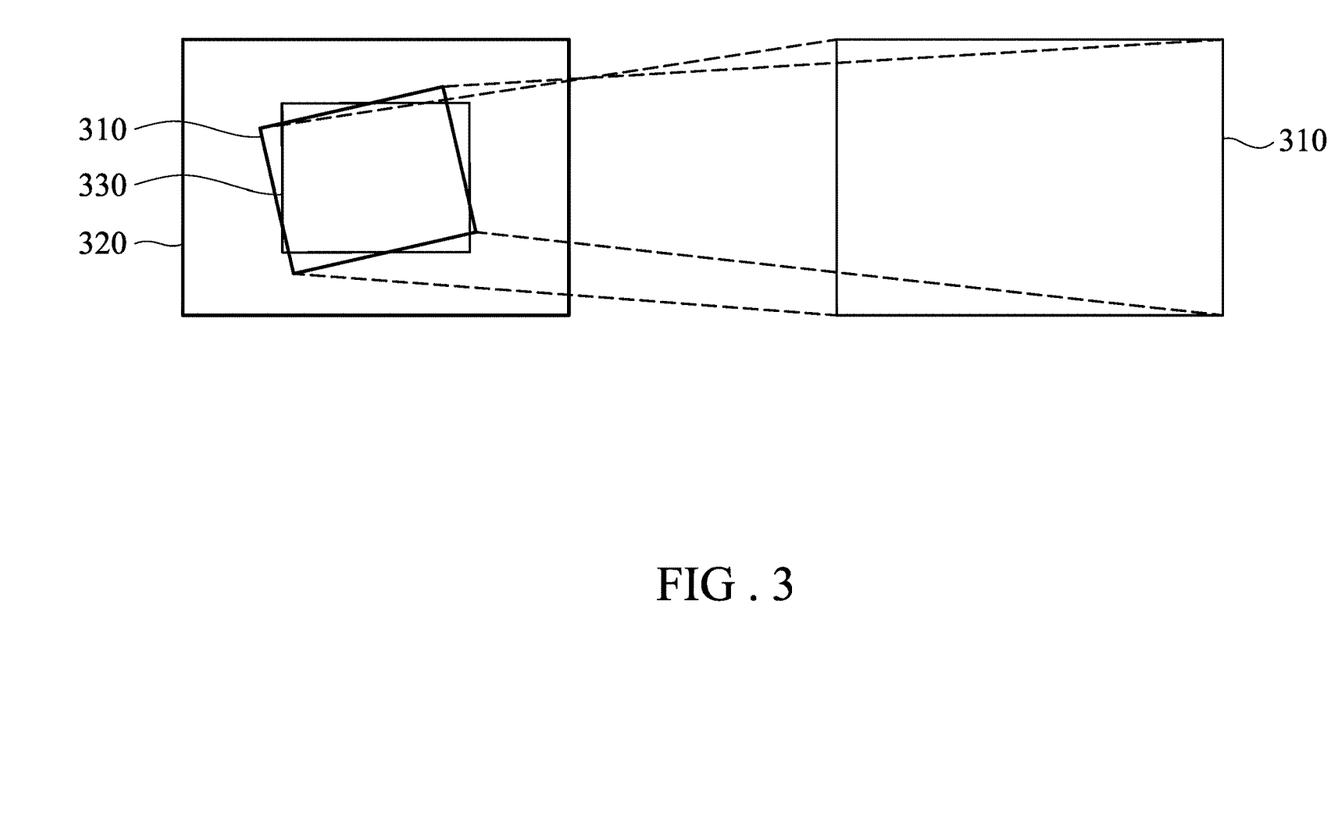
FIG. 3 is an example of a wide image sensor, a telephoto image sensor, and their respective FOVs with a misalignment error.

FIG. 3 is an example of a wide image sensor, a telephoto image sensor, and their respective FOVs with a misalignment error. In the example of FIG. 3, the FOV 310 of the telephoto image sensor 122 is half the FOV 320 of the wide image sensor 112. For purposes of description, the resolutions of the telephoto image sensor 122 and the wide image sensor 112 are the same, and the telephoto lens 121 has a counterclockwise rotation angle relative to the wide lens 111 along the optical axis of the wide lens 111. It should be noted that the FOV 330 may indicate the FOV of the telephoto image sensor 122 without misalignment errors.

Since there is a misalignment error (i.e. rotation error) between the wide lens 111 and the telephoto lens 121, the user may feel that the preview image is jaggy when the zooming factor is increased from 1 to 2. Specifically, the telephoto image generated by the telephoto imaging section 120 may be skewed in comparison with the wide image, and thus the processor 130 cannot directly switch the reference image from the wide image to the telephoto image when the zooming factor is increased from 1 to 2. If the processor 130 directly switch the reference image from the wide image to the telephoto image with the zooming factor being increased to 2, the user may easily perceive the jaggy preview image displayed on the display panel 140, resulting in poor user's experience.

It should be noted that misalignment errors can be defined in six degrees of freedom such as x, y, z, θx, θy, and θz, and thus the misalignment errors can be expressed as a translation matrix, a scaling matrix, a rotation matrix, or a combination thereof.

In an embodiment, when the processor 130 has received the wide image from the wide imaging section 110 and the telephoto image from the telephoto imaging section 120, the processor 130 may estimate the translation matrix, scaling matrix, and the rotation matrix. Then, the processor 130 may align the wide image and/or the telephoto image based on the estimated translation matrix, scaling matrix, and the rotation matrix, so that the image zooming function can be performed based on the aligned wide image and the aligned telephoto image, thereby reducing the zooming image defects caused by misalignment errors between the wide lens 111 and the telephoto lens 121.

Table 1 shows the manufacturing tolerance values of dual-camera modules in different specifications.

cause a greater impact on image zooming, as will be described in the following embodiments.

Figure 4:
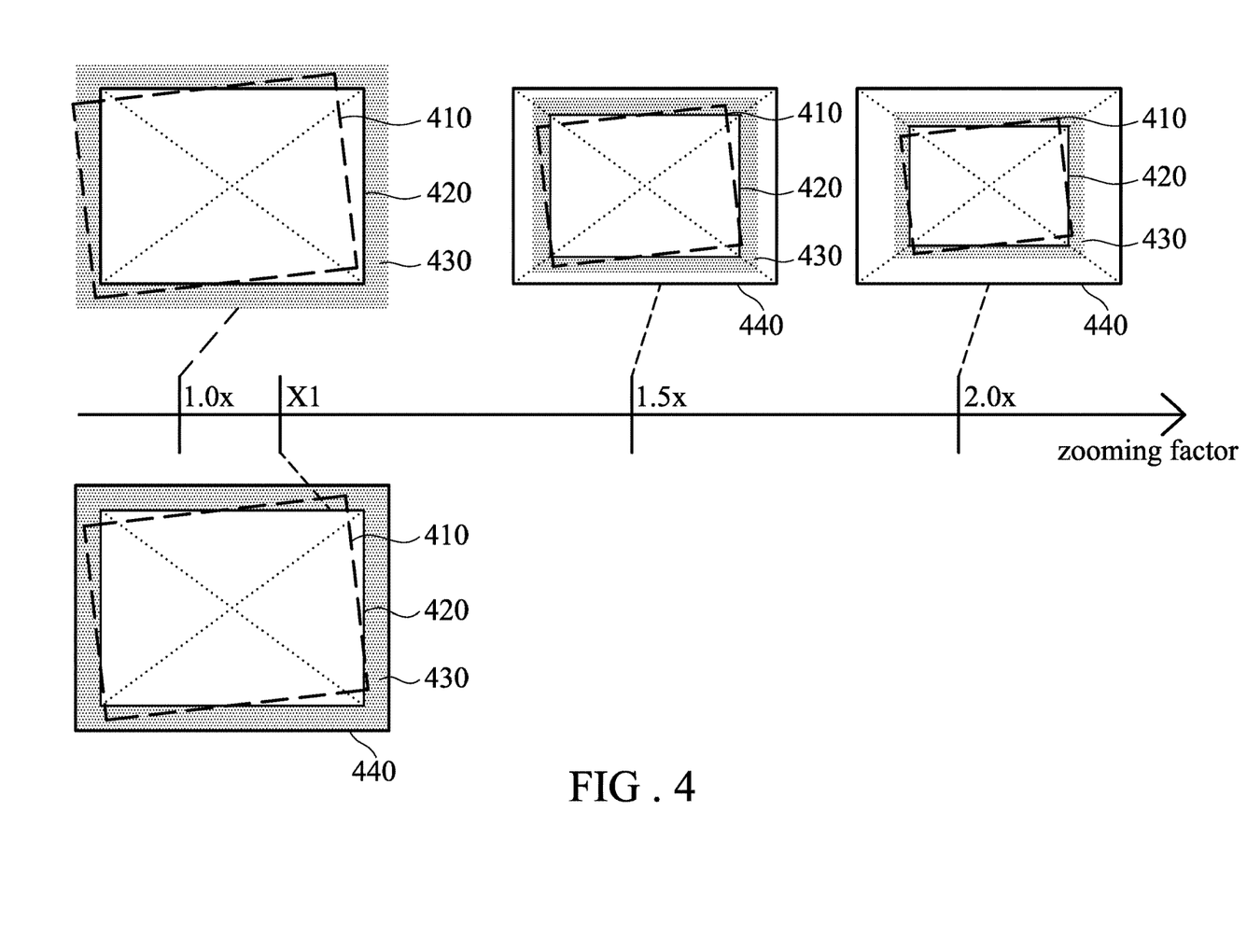
FIG. 4 is a diagram of the FOVs of the wide image sensor and the telephoto image sensor in different zooming factors in accordance with an embodiment of the invention.

FIG. 4 is a diagram of the FOVs of the wide image sensor and the telephoto image sensor in different zooming factors in accordance with an embodiment of the invention.

In the first scenario, for simplicity, it is assumed that the telephoto image has an offset of 100 pixels toward the negative X-axis and a rotation angle of 1 degree counterclockwise relative to the wide image. Additionally, for purposes of description, the FOV of the wide lens 111 is twice that of the telephoto lens 121, and the resolution of the wide image sensor 112 and the telephoto image sensor 122 is 4032*3016 (i.e. 4K*3K). For purposes of description, the aforementioned specifications will be also used in the following embodiments in FIGS. 4-9.

In the embodiment, the processor 130 may use the telephoto image as the reference image for image zooming when the zooming factor is within the range from 1 to 2. When the zooming factor is set to a value between 1 and 2, the processor 130 may warp the wide image with a counterclockwise rotation angle of 1 degree and with an offset of 100 pixels toward the negative X-axis. Thus, the warped wide image can be aligned with the telephoto image when the zooming factor is 2. Specifically, the zooming factor being 2 is a switch point of the zoomed image that is switched from the wide image to the telephoto image, or switch from the telephoto image to the wide image. Since there is a rotation angle and an offset value on the X-axis between the wide image and the telephoto image, the wide image can be warped to align with the telephoto image at the zooming factor of 2. Thus, the user will not perceive the jagged zoomed image while adjusting the zooming factor.

As illustrated in FIG. 4, since there is a rotation angle and an offset value on the X-axis between the wide image and the telephoto image, the actual FOV 410 of the telephoto image may be derived from the FOV 420 of the telephoto image without misalignment errors. That is, the FOV 410 can be obtained by rotating and shifting the FOV 420 without misalignment errors. In addition, the block 430 indicates the margin of the wide imaging sensor 112. Specifically, when the zooming factor is set to 2, the resolution of the wide image will be down-scaled to 2016*1508, and the processor may warp the down-scaled wide image by rotating and shifting to align with the telephoto image. No matter the zooming factor is decreased or increased to 2, the warped wide image may align with the telephoto image.

TABLE 1

| Type | Baseline (mm) | | Optical Axis | | | Optical center@1080 p (pixel) | | Margin on wide image (%) | |
|---|---|---|---|---|---|---|---|---|---|
| | X | Y | Rx (tilt) | Ry (tilt) | Rz (rot) | OC-X | OC-Y | Hor. | Ver. |
| SPEC1 | ±0.1 | ±0.1 | ±0.5° | ±0.5° | ±0.5° | ±10 | ±10 | 3.96% | 5.57% |
| SPEC2 | ±0.2 | ±0.2 | ±1.0° | ±1.0° | ±1.0° | ±10 | ±10 | 7.92% | 11.00% |
| SPEC3 | ±0.3 | ±0.3 | ±1.5° | ±1.5° | ±1.5° | ±10 | ±10 | 11.88% | 16.57% |

As shown in Table 1, the dual camera module in SPEC1 has the smallest manufacturing tolerance values, and has the smallest margin on the wide image. The dual-camera module in SPEC3 has the greatest manufacturing tolerance values, and has the largest margin on the wide image. Specifically, higher manufacturing tolerance values may When the zooming factor is set to 1.5, the resolution of the wide image will be down-scaled to 2688×2011, and the processor may also warp the down-scaled wide image by rotating and shifting, thereby aligning the warped wide image with other warped wide image with different zooming factors.

When the zooming factor is set to a value X1 that is slightly higher than 1, the resolution of the wide image will be down-scaled to a resolution less than 4032*3016. It should be noted a corner of the FOV 410 of the telephoto image is exactly located on one of the boundaries of the margin 430, and the FOV 410 will not exceed the boundaries of the margin 430. It indicates that the zooming factor has been set to the minimum value X1 that does not sacrifice any image pixels during image zooming. Block 440 indicates the FOV of the wide imaging sensor 112.

Specifically, if the zooming factor is set to another value (e.g. 1.0) smaller than the value X1, the FOV 410 of the telephoto image that is mapped to the margin 430 of the wide sensor 112 may exceed the boundaries of the wide image. It indicates that the telephoto image may include pixels that do not exist in the wide image, and thus the warped wide image will not align with the telephoto image. In this case that the zooming factor is smaller than X1, the preview image is generated by the wide image with the zooming factor of X1. It should be noted that the FOV 440 of the wide image sensor 112 and the FOV 420 of the telephoto image sensor 122 without misalignment errors are overlapped with the zooming factor of 1.

It should be noted that the size of the margin 430 depends on the manufacturing tolerance values of the dual-camera device. When the tolerance values are lower, the size of the margin 430 is smaller. When the tolerance values are higher, the size of the margin 430 is larger.

Figure 5:
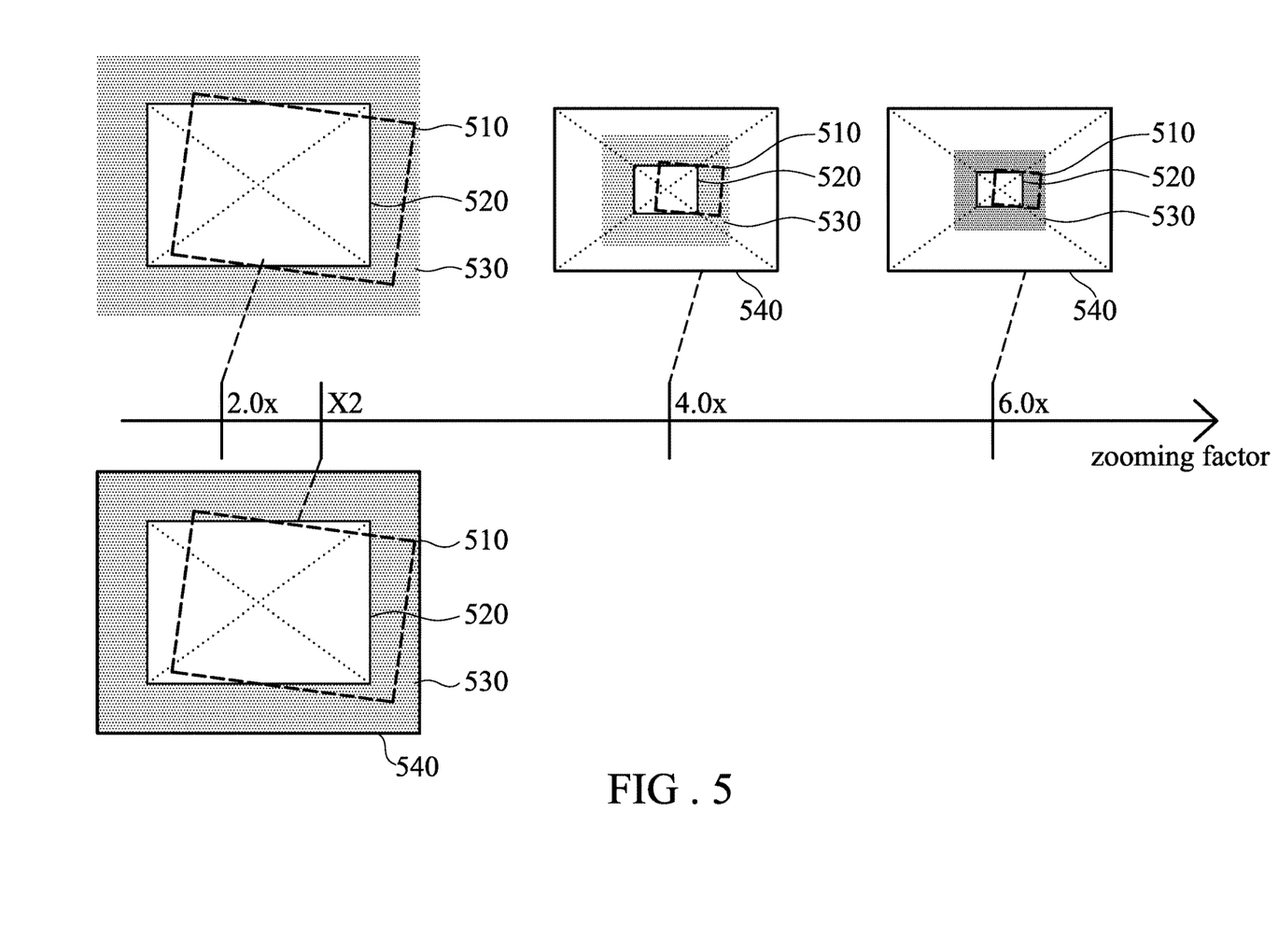
FIG. 5 is a diagram of the FOVs of the wide image sensor and the telephoto image sensor in different zooming factors in accordance with another embodiment of the invention.

FIG. 5 is a diagram of the FOVs of the wide image sensor and the telephoto image sensor in different zooming factors in accordance with another embodiment of the invention.

In the second scenario, as illustrated in FIG. 5, when the zooming factor is set to 2, the actual FOV 510 of the wide image that is mapped to the margin 530 of the telephoto image sensor 122 does not exceed the boundaries of the margin 530. The FOV 520 indicates the FOV of the wide image without misalignment errors. Thus, the processor 130 may still use the wide image to generate the preview image. It should be noted that the resolution of the telephoto image with the zoom factor of 2 (e.g. a desired zooming factor) is 4032*3016 (i.e. the highest resolution). However, in this case, since FOV 510 exceeds the tele camera FOV 520, the processor 130 cannot use tele image to generate the preview image.

When the zooming factor has been increased to a value X2 (i.e. an actual switching zooming factor) that is slightly higher than 2, one corner of the actual FOV 510 of the wide image that is mapped to the margin 530 of the telephoto image sensor may exactly located on one of the boundaries of the margin 530, and thus the processor 130 may still use the wide image to generate the preview image without sacrificing any pixel. In this case, the resolution of the telephoto image may be smaller than 4032*3016. The block 540 indicates the FOV of the telephoto image sensor 122. In this case, since FOV 510 does not exceed the tele camera FOV 520, the processor 130 may use tele image to generate the preview image.

When the zooming factor is set to a higher value than X2, the actual FOV 510 of the wide image that is mapped to the margin 530 of the telephoto image sensor 122 may exceed the boundaries of the margin 530, and thus the processor 130 may use the telephoto image to generate the preview image. For example, the processor 130 may warp the telephoto image with a clockwise rotation angle of 1 degree and with an offset of 200 pixels toward the positive X-axis.

For example, when the zooming factor is set to 4, the processor 130 may use the telephoto image to generate the preview image. For example, the processor 130 may warp the telephoto image with a clockwise rotation angle of 1 degree and with an offset of 200 pixels toward the positive X-axis. In this case, the resolution of the telephoto image is 2016*1508.

When the zooming factor is set to 6, the processor 130 may use the telephoto image to generate the preview image. For example, the processor 130 may warp the telephoto image with a clockwise rotation angle of 1 degree and with an offset of 200 pixels toward the positive X-axis. In this case, the resolution of the telephoto image is 1344*1005.

Figure 6:
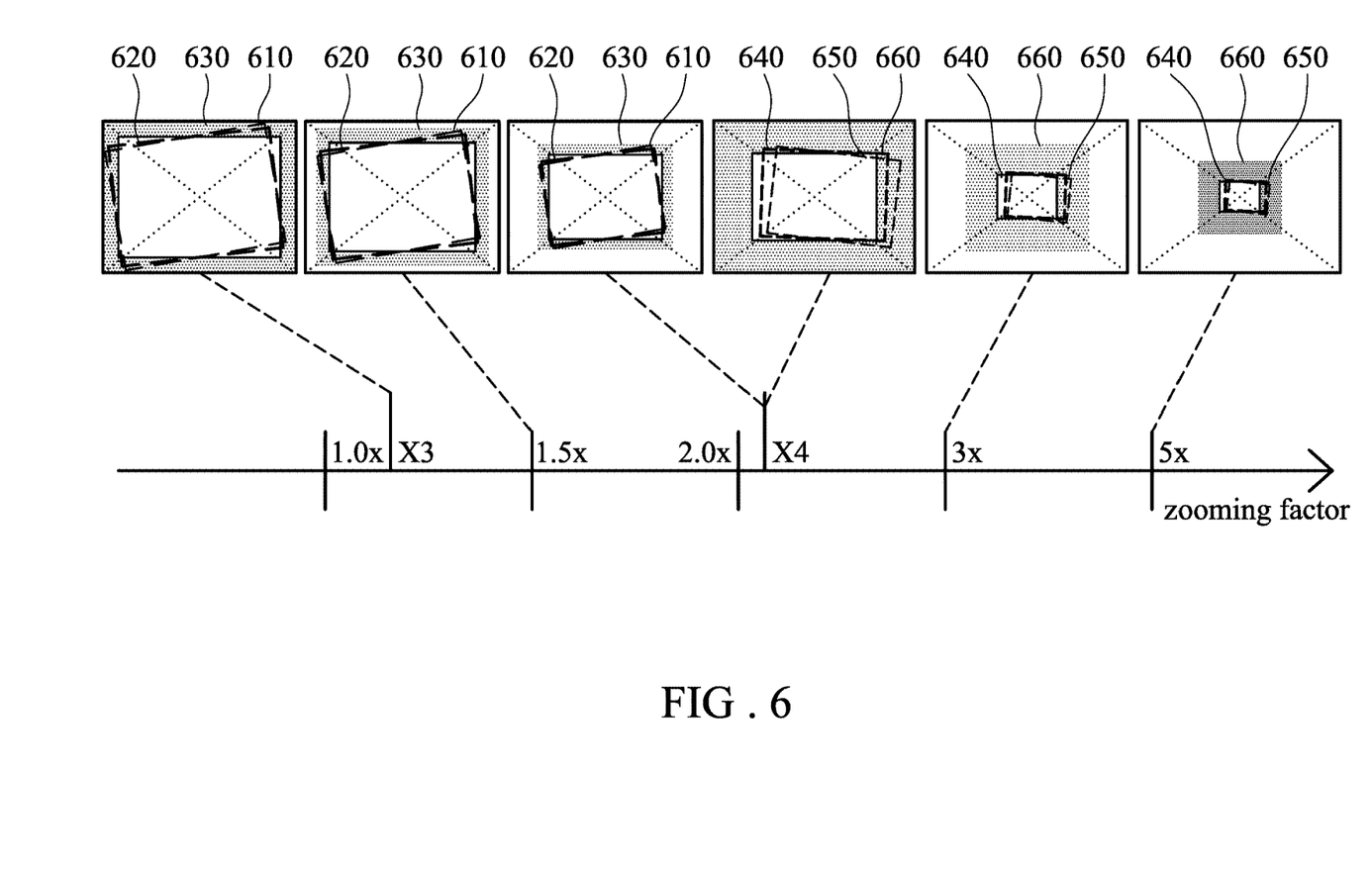
FIG. 6 is a diagram of the FOVs of the wide image sensor and the telephoto image sensor in different zooming factors in accordance with yet another embodiment of the invention.

FIG. 6 is a diagram of the FOVs of the wide image sensor and the telephoto image sensor in different zooming factors in accordance with yet another embodiment of the invention.

Compared with the embodiments in FIG. 4 and FIG. 5, in the third scenario, the misalignment errors are shared by the wide image and the telephoto image in the embodiment of FIG. 6. For example, the telephoto image is used as the reference image for image zooming in FIG. 4, and the wide image is used as the reference image for image zooming in FIG. 5. However, the zoom factor values X1 and X2 may depend on the manufacturing tolerance values of the dual-camera device.

In order to improve the image quality of the preview image, the misalignment errors are shared by the wide image and the telephoto image in the embodiment of FIG. 6. Specifically, the wide image is rotated counterclockwise by 0.5 degree and shifted toward the negative X-axis by 50 pixels, thereby generating a base wide image. Similarly, the telephoto image is rotated clockwise by 0.5 degree and shifted toward the positive X-axis by 100 pixels, thereby generating a base telephoto image. It should be noted that different rotation angles and shift values of the wide image and the telephoto image due to different FOVs and resolutions of the wide image and telephoto image. Thus, the techniques disclosed in the embodiments in FIG. 4 and FIG. 5 can be used here using the base wide image and the base telephoto image.

It should be noted that the minimum zooming factor X3 in the embodiment of FIG. 6 may be smaller than the zooming factor X1 in the embodiment of FIG. 4. For example, the FOV 620 of the base telephoto image that is mapped to the margin 630 of the wide image sensor 112 may be within the boundaries of the margin 630. However, the FOV 610 of the telephoto image that is mapped to the margin 630 of the wide image sensor 112 may be exactly located on the boundaries of the margin 630. Accordingly, the minimum zooming factor X3 can be obtained when the FOV 620 of the base telephoto image is exactly located on one of the boundaries of the margin 630, and the zooming factor X3 is smaller than the zooming factor X1.

Similarly, the zooming factor X4 in the embodiment of FIG. 6 may be smaller than the zooming factor X2 in the embodiment of FIG. 5. For example, as illustrated in FIG. 6, when the zooming factor is X2, the FOV 640 of the base wide image that is mapped to the margin 660 of the telephoto image sensor 122 may exceed the boundaries of the margin 660 since the base wide image is obtained from the wide image with a rotation angle and a shifting value. However, when the zooming factor is X4, the FOV 650 of the wide image that is mapped to the margin 660 may be exactly located on the boundaries of the margin 660. Accordingly, the maximum zooming factor for switching the wide image to the telephoto image can be reduced, so that the FOV of the base wide image that is mapped to the margin 660 will not exceed the boundaries of the margin 660. Thus, when the FOV 640 of the base wide image mapped to the margin 660 is exactly located on the boundaries of the margin 660, the maximum zooming factor X4 can be obtained.

Figure 7:
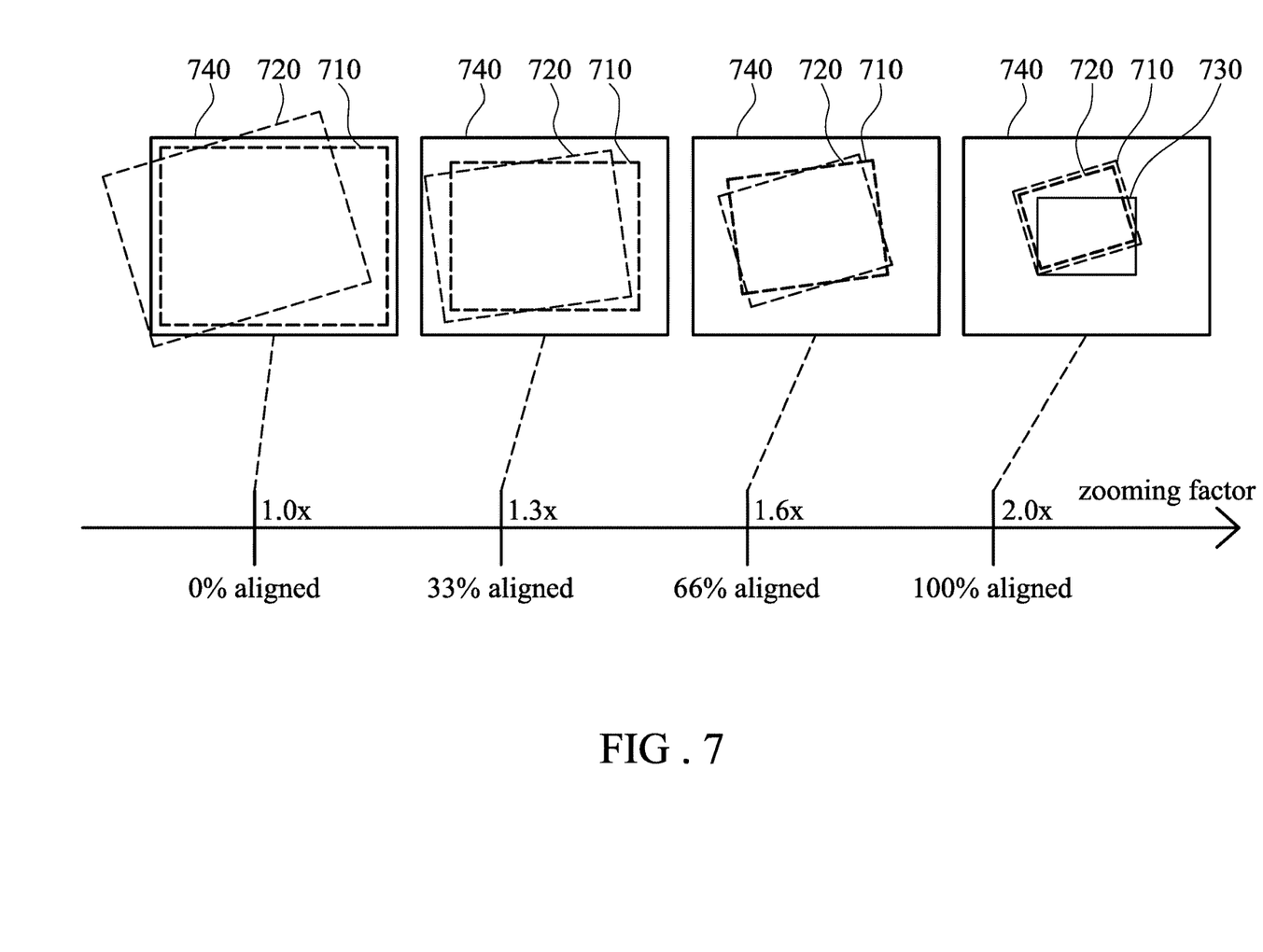
FIG. 7 is a diagram of the FOVs of the wide image sensor and the telephoto image sensor in different zooming factors in accordance with an embodiment of the invention.

FIG. 7 is a diagram of the FOVs of the wide image sensor and the telephoto image sensor in different zooming factors in accordance with an embodiment of the invention. In the fourth scenario, the misalignment errors applied on the wide image may be associated with the zooming factor. For example, the misalignment errors applied on the wide image may be linearly proportional to the zooming factor. Alternatively, the misalignment errors applied on the wide image may be linearly proportional to the zooming factor.

In the aforementioned embodiments in FIGS. 4-6, the center of the wide image exactly matches that of the telephoto image with the zooming factor of 2. Moreover, in the embodiment of FIG. 4, due to the misalignment error, a portion of the resolution of the wide image sensor 112 may be sacrificed (i.e. the minimum zooming factor X1 is slightly greater than 1) while warping the wide image to align with the telephoto image.

In order to achieve seamless zooming, the user should not perceive any jagged image or shifted image while performing image zooming. In the embodiment of FIG. 7, the processor 130 may directly use the wide image from the wide imaging section 110 to generate the preview image without performing image alignment. As the zooming factor is gradually increased, a portion of the misalignment error correction, or wide/tele alignment, (e.g. in percent) is applied to the wide image.

For example, block 740 indicates the full-resolution wide image with the zooming factor of 1. Block 710 indicates the wide image with the current zooming factor, and block 720 indicates the warped wide image using the technique disclosed in FIG. 4. When the zooming factor is set to 1, none of the misalignment errors is applied to the wide image 710. When the zooming factor is set to 2, 100% of the misalignment errors correction or wide/tele alignment can be applied to the wide image 710. As illustrated in FIG. 7, when the zooming factor is set to 1.3, 33% of the misalignment errors can be applied to the wide image. When the zooming factor is set to 1.6, 66% of the misalignment errors can be applied to the wide image. Accordingly, the portion of the misalignment errors applied to the wide image may depend on the zooming factor. It should be noted that the telephoto image is directly used to generate the preview image without applying any misalignment errors when the zooming factor is equal to or greater than 2 in the embodiment.

The techniques for warping the wide image can be referred to in the aforementioned embodiments, and thus the details will be omitted here. It should be noted that the resolution of the wide image sensor 112 is not sacrificed when the zooming factor is close to 1 in the embodiment. When the misalignment errors are not significant, the user will not perceive that the zooming image is gradually shifted and rotated with the increment of the zooming factor.

Figure 8:
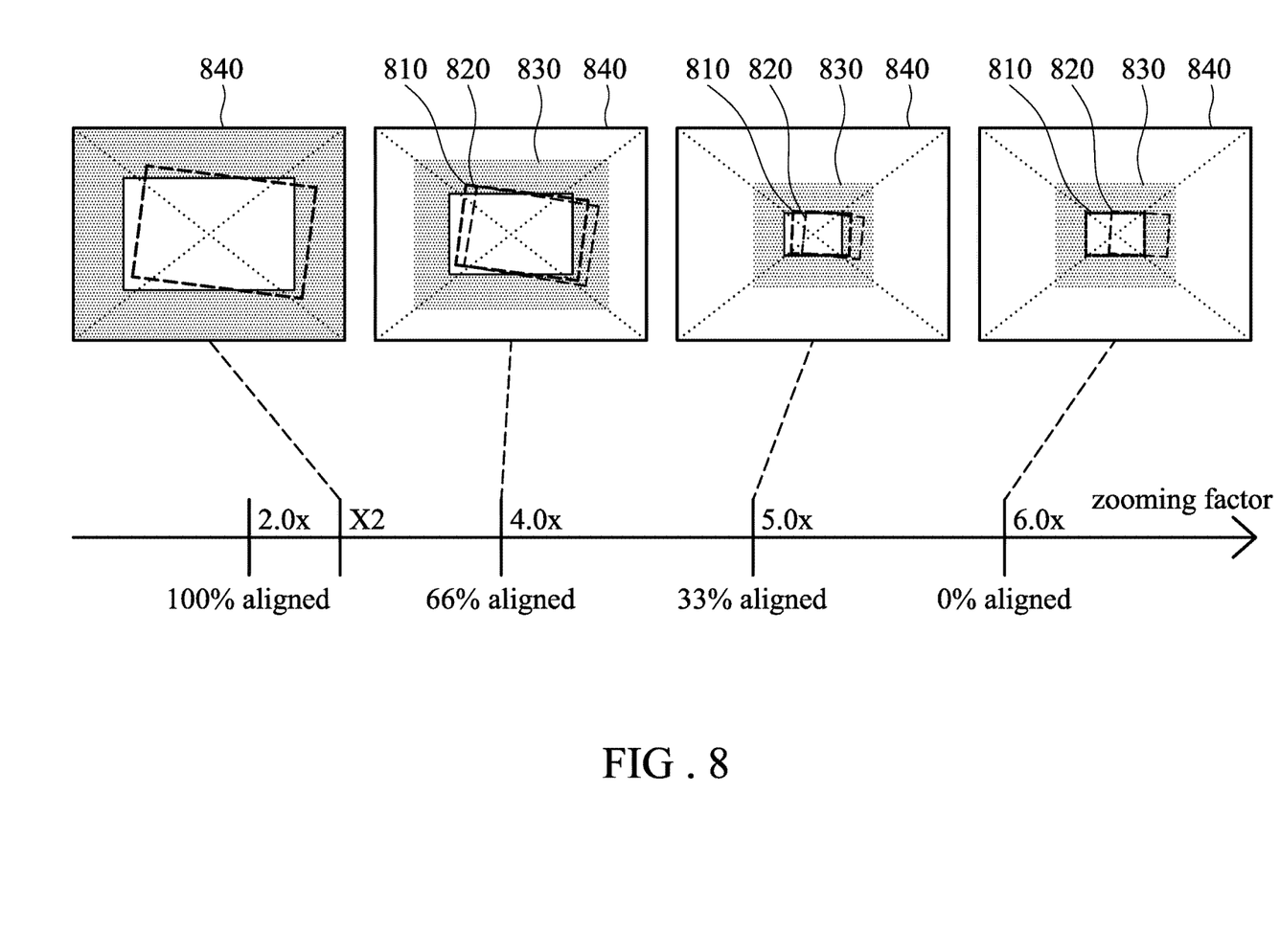
FIG. 8 is a diagram of the FOVs of the wide image sensor and the telephoto image sensor in different zooming factors in accordance with another embodiment of the invention.

FIG. 8 is a diagram of the FOVs of the wide image sensor and the telephoto image sensor in different zooming factors in accordance with another embodiment of the invention.

In the fifth scenario, the misalignment errors applied on the telephoto image may be proportional to the zooming factor from 2 to a predetermined number (e.g. 6.0). For example, in the aforementioned embodiments in FIGS. 4-6, the center of the wide image exactly matches that of the telephoto image with the zooming factor of 2. Moreover, in the embodiment of FIG. 5, due to the misalignment errors, the image switching from the wide image to the telephoto image during image zooming may happen when the zooming factor is greater than 2 (e.g. zooming factor X2).

In the embodiment of FIG. 8, when the zooming factor is between 2 and X2, the wide image is directly used to generate the preview image. When the zooming factor is increased to X2, the misalignment errors correction or wide/tele alignment may be fully applied (i.e. 100%) to the telephoto image to generate the preview image. When the zooming factor is set to 6.0, the processor 130 may directly use the telephoto image to generate the preview image without applying any misalignment errors, and the resolution of the telephoto image is 1344*1005. It should be noted that the wide image is used to generate the preview image without applying any misalignment errors correction or wide/tele alignment when the zooming factor is smaller than 2 in the embodiment.

In addition, when the zooming factor is set to 4.0, 66% of the misalignment errors may be applied to the telephoto image, and the resolution of the telephoto image is 2016*1508. When the zooming factor is set to 5.0, 33% of the misalignment errors may be applied to the telephoto image, and the resolution of the telephoto image is 1344*1005. It should be noted that the resolution of the telephoto image is 1344*1005 with the zooming factor being from 5.0 to 6.0, but the portion of the misalignment errors applied to the telephoto image is still gradually decreased from 33% to 0% as the zooming factor gradually is increased from 5.0 to 6.0.

Since the telephoto image has the best modulation transfer function (MTF) at its center, it would be beneficial to move the center of the telephoto image to the center of the display panel 140, and thus the user may perceive a better image quality of the preview image. In the embodiments of FIG. 7 and FIG. 8, the techniques for applying the misalignment errors on the wide image or the telephoto image in proportion to the zooming factor can be regarded as a "center shifting" technique.

In another embodiment, the techniques of using the base wide image and the base telephoto image in the embodiment of FIG. 6 can be used together with the "center shifting" technique as disclosed in the embodiments of FIG. 7 and FIG. 8. For example, the wide image can be replaced by the base wide image that has half misalignment errors in the embodiment of FIG. 7, and the telephoto image can be replaced by the base telephoto image that has half misalignment errors in the embodiment of FIG. 8. Accordingly, the overall image quality of the preview images at all zooming levels can be improved.

Figure 9:
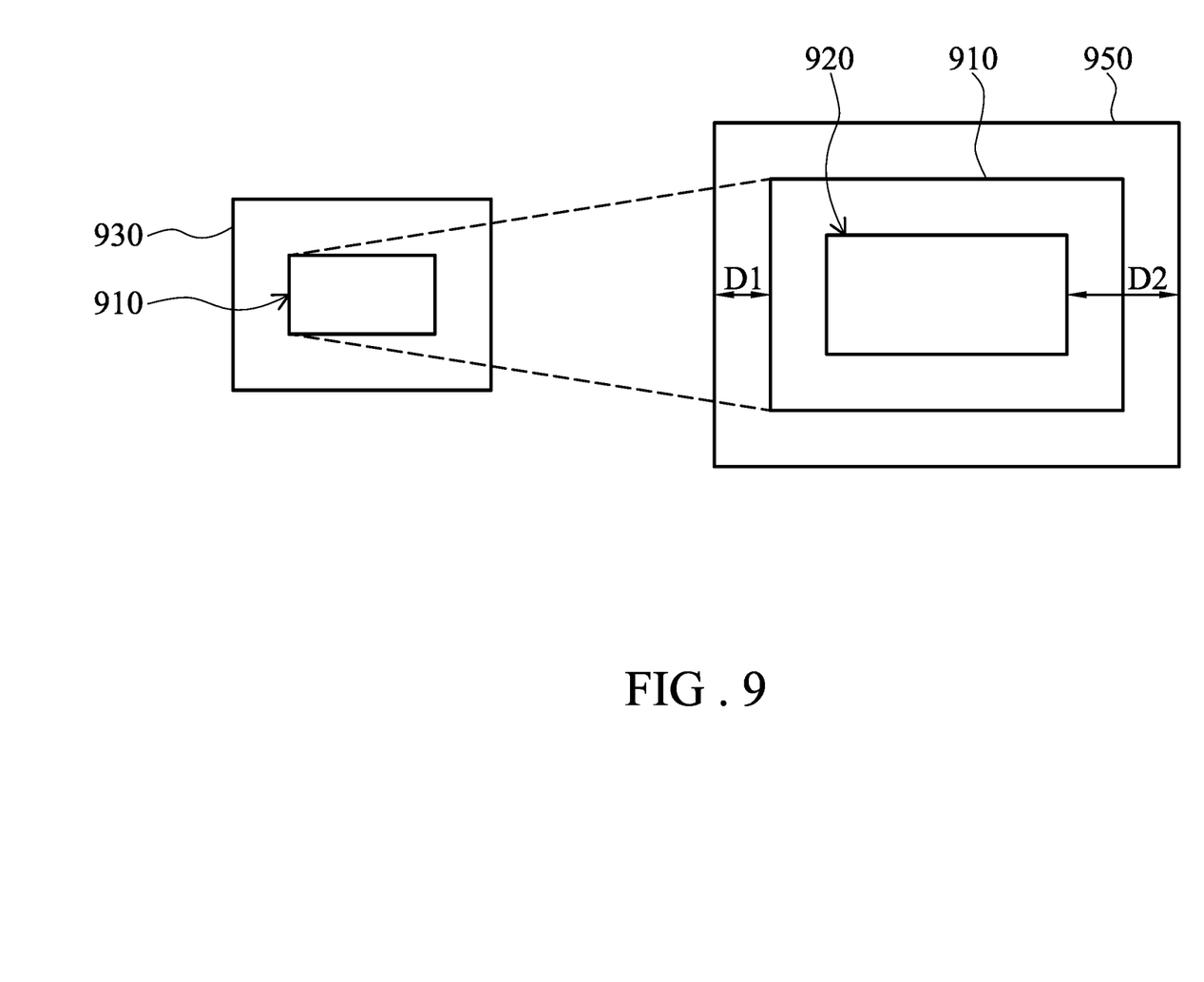
FIG. 9 is a diagram of the FOVs of the wide image sensor and the telephoto image sensor in accordance with an embodiment of the invention.

FIG. 9 is a diagram of the FOVs of the wide image sensor and the telephoto image sensor in accordance with an embodiment of the invention. It should be noted that the portions of misalignment errors (e.g. the rotation angle and shifting pixels) to warp both the wide image and telephoto image may be not limited to 50%, and the portions may have a ratio of a/b. It is assumed that the telephoto image has an offset of S1 pixels toward the negative X-axis and a counterclockwise rotation angle of R1 degree relative to the wide image. Equivalently, in other words, the wide image has an offset of S2 pixels toward the positive X-axis and a clockwise rotation angle of R2 degree relative to the telephoto image.

For example, block 930 indicates the full-resolution wide image. The desired zooming factor for image switching during image zooming may be N1 (e.g. a desired zooming factor, e.g. equal to 2.0 in FIG. 5), and the actual zooming factor for image switching may be N2 (e.g. an actual zooming factor X2 in FIG. 5) due to the misalignment errors.

Referring to FIG. 9, the FOV 910 of the wide lens 111 using the zooming factor N1 can be mapped to the margin 950 of the telephoto image sensor 112. The FOV 920 of the telephoto lens 121 using the zooming factor N2 may be narrower than the FOV 910. The processor 130 may estimate a first distance (e.g. in pixels) D1 between the boundaries of the FOV 910 and the margin 950, and a second distance (e.g. in pixels) D2 between the boundaries of the FOV 920 and the margin 950. Then, the portion of the misalignment errors to warp the telephoto image may be D1/D2, and the portion of the misalignment errors to warp the wide image may be (1−D1/D2).

Accordingly, the processor 130 may warp the telephoto image with a counterclockwise rotation angle of (R1*D1/D2) degrees and a shifting distance of (S1*D1/D2), and warp the wide image with a clockwise rotation angle of R2*(1−D1/D2) degrees and a shifting distance of S2*(1−D1/D2). It should be noted that the technique for determining the portion of misalignment errors can be used together with the technique to warp both the wide image and telephoto image, as described in the aforementioned embodiments.

In view of the above, a dual-camera device and various digital image zooming methods have been provided to achieve seamless image zooming, thereby reducing the image defects of the preview images during image zooming.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dual-camera device, comprising:
a wide imaging section, comprising a wide lens with a wide field of view (FOV), and a wide image sensor, wherein the wide imaging section provides wide image data of an object or scene;
a telephoto imaging section, comprising a telephoto lens with a telephoto FOV that is narrower than the wide FOV, and a telephoto image sensor, wherein the telephoto imaging section provides telephoto image data of the object or scene, and at least one misalignment error exists between the wide imaging section and the telephoto imaging section; and
a processor, coupled to the wide imaging section and the telephoto imaging section, and configured to generate an output image provided with a substantially continuous transition when switching between a lower zooming factor and a higher zooming factor,
wherein the processor warps the wide image data using a portion of the at least one misalignment error to generate base wide image data, and warps the telephoto image data using a remaining portion of the at least one misalignment error to generate base telephoto image data,
wherein the processor generates the output image using the base wide image data at the lower zooming factor, and generates the output image using the base telephoto image data at the higher zooming factor.

2. The dual-camera device as claimed in claim 1, wherein the portion of the at least one misalignment error is 50%.

3. The dual-camera device as claimed in claim 1, wherein the portion of the at least one misalignment error is determined according to a first ratio of a first distance and a second distance.

4. The dual-camera device as claimed in claim 3, wherein the first distance is a distance between boundaries of a first field of view (FOV) of the wide image data using a first zooming factor and a margin of the telephoto image sensor, and the second distance is a distance between boundaries of a second FOV of the telephoto image data using a second zooming factor and the margin of the telephoto image sensor, wherein the second zooming factor is larger than the first zooming factor.

5. The dual-camera device as claimed in claim 1, wherein when the lower zooming factor is smaller than a first zooming factor, the processor generates the output image using the base wide image data at the first zooming factor.

6. The dual-camera device as claimed in claim 1, wherein when the higher zooming factor is greater than a second zooming factor, the processor generates the output image using the base telephoto image data,
wherein when the higher zooming factor is between the second zooming factor and a switching zooming factor that is lower than the second zooming factor, the processor generates the output image using the base wide image data, and the telephoto image data has a highest resolution at the switching zooming factor.

7. A dual-camera device, comprising:
a wide imaging section, comprising a wide lens with a wide field of view (FOV), and a wide image sensor, wherein the wide imaging section provides wide image data of an object or scene;
a telephoto imaging section, comprising a telephoto lens with a telephoto FOV that is narrower than the wide FOV, and a telephoto image sensor, wherein the telephoto imaging section provides telephoto image data of the object or scene, and at least one misalignment error exists between the wide imaging section and the telephoto imaging section; and
a processor, coupled to the wide imaging section and the telephoto imaging section, and configured to generate an output image provided with a substantially continuous transition when switching between a lower zooming factor and a higher zooming factor,
wherein the processor generates the output image using the wide image data at the lower zooming factor,
wherein the processor warps the telephoto image data using a portion of the at least one misalignment error, and the portion of the at least one misalignment error is associated with the higher zooming factor,
wherein the processor generates the output image using the warped telephoto image data at the higher zooming factor, and
wherein the portion of the at least one misalignment error is in proportion to the higher zooming factor when the higher zooming factor is between a first zooming factor and a second zooming factor that is greater than the first zooming factor.

8. The dual-camera device as claimed in claim 7, when the higher zooming factor is between the first zooming factor and a switching factor, the processor generates the output image using the wide image data, and the telephoto image data has a highest resolution at the switching zooming factor.

9. A dual-camera device, comprising:
a wide imaging section, comprising a wide lens with a wide field of view (FOV), and a wide image sensor, wherein the wide imaging section provides wide image data of an object or scene;
a telephoto imaging section, comprising a telephoto lens with a telephoto FOV that is narrower than the wide FOV, and a telephoto image sensor, wherein the telephoto imaging section provides telephoto image data of the object or scene, and at least one misalignment error exists between the wide imaging section and the telephoto imaging section; and
a processor, coupled to the wide imaging section and the telephoto imaging section, and configured to generate an output image provided with a substantially continuous transition when switching between a lower zooming factor and a higher zooming factor,
wherein the processor warps the wide image data using a portion of the at least one misalignment error to generate base wide image data, and the portion of the at least one misalignment error is associated with the lower zooming factor,
wherein the processor warps the telephoto image data using a remaining portion of the at least one misalignment error to generate base telephoto image data, and the remaining portion of the at least one misalignment error is associated with the higher zooming factor,
wherein the processor generates the output image using the base wide image data at the lower zooming factor, and generates the output image using the base telephoto image data at the higher zooming factor.

10. The dual-camera device as claimed in claim 9, wherein the portion of the at least one misalignment error is 50%.

11. The dual-camera device as claimed in claim 9, wherein the portion of the at least one misalignment error is determined according to a first ratio of a first distance and a second distance.

12. The dual-camera device as claimed in claim 11, wherein the first distance is a distance between boundaries of a first field of view (FOV) of the wide image data using a first zooming factor and a margin of the telephoto image sensor, and the second distance is a distance between boundaries of a second FOV of the telephoto image data using a second zooming factor and the margin of the telephoto image sensor, wherein the second zooming factor is larger than the first zooming factor.

13. The dual-camera device as claimed in claim 9, wherein when the higher zooming factor is greater than a second zooming factor, the processor generates the output image using the base telephoto image data,
wherein when the higher zooming factor is between the second zooming factor and a switching zooming factor that is lower than the second zooming factor, the processor generates the output image using the base wide image data, and the telephoto image data has a highest resolution at the switching zooming factor.

* * * * *